United States Patent [19]

Siol

[11] Patent Number: 5,053,276

[45] Date of Patent: Oct. 1, 1991

[54] COMPATIBLE POLYMER BLENDS

[75] Inventor: Werner Siol, Darmstadt-Eberstadt, Fed. Rep. of Germany

[73] Assignee: Rohm GmbH Chemische Fabrik, Darmstadt, Fed. Rep. of Germany

[21] Appl. No.: 606,815

[22] Filed: Oct. 31, 1990

Related U.S. Application Data

[62] Division of Ser. No. 357,264, May 26, 1989, Pat. No. 4,985,504.

[30] Foreign Application Priority Data

Jun. 3, 1988 [DE] Fed. Rep. of Germany ....... 3818837
Sep. 22, 1988 [DE] Fed. Rep. of Germany ....... 3834599

[51] Int. Cl.$^5$ .................. C08L 37/00; B32B 27/00; D02G 3/00
[52] U.S. Cl. ...................................... 428/394; 526/206
[58] Field of Search ......................... 428/394; 526/206

[56] References Cited

U.S. PATENT DOCUMENTS 2,925,399  2/1990  Schneider et al. ............... 525/214
4,593,974  6/1986  Yamamoto et al. ............... 428/394
4,720,428  1/1988  Ohmori et al. ................... 428/394

Primary Examiner—Marion E. McCamish
Assistant Examiner—Susan Berman
Attorney, Agent, or Firm—Oblon, Spivak, McClelland, Maier & Neustadt

[57] ABSTRACT

Polymer blends composed of two different polymers P1 and P2, which form compatible polymer mixtures where polymer P1 is composed of at least 20 and up to 100% by weight of styrene and polymer P2 is composed of at least 20 and up to 100% by weight of monomers with Formula I

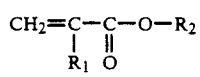

where $R_1$ is hydrogen, methyl or a group

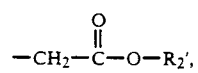

and where $R_2$ or $R'_2$, are a group

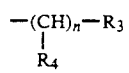

where n is 0-3, $R_3$ is a 5-8 membered heterocyclic ring, optionally substituted, containing at least 2 hetero atoms in the ring, one heteroatom being oxygen, and $R_4$ is hydrogen or an alkyl group with 1-6 carbon atoms.

20 Claims, No Drawings

COMPATIBLE POLYMER BLENDS

This is a division of application Ser. No. 07/357,264, filed on May 26, 1989, now U.S. Pat. No. 4,985,504.

BACKGROUND OF THE INVENTION

1. Field of the Invention

The invention concerns polymers which form compatible (miscible) polymer mixtures (polymer blends), specifically of a polymer P1 containing styrene as the monomer, and a polymer P2 containing a heterocyclic group with 5–8 ring atoms and at least 2 hetero atoms in the ring, and objects made of these polymers, where one of the polymers forms a coating on the other polymer or on the polymer blend, e.g. a coating on the compatible polymer mixtures.

2. Discussion of the Background

As a rule, different polymer species are considered to be incompatible with one another, i.e. different polymer species generally do not form a homogeneous phase, which would be characterized by complete miscibility of the components, down to small amounts of a component.

Certain exceptions to this rule have caused increasing interest, particularly among the experts concerned with the theoretical interpretation of the phenomena. Completely compatible mixtures of polymers demonstrate complete solubility (miscibility) in all mixture ratios.

A summary representation of miscible polymer systems can be found, for example, in D.R. Paul et al., Polymer and Engineering Science, 18 (16) 1225–34 (1978); J. Macromol. Sci. Rev. Macromol. Chem. C., 18 (1), 109–168 (1980).

As evidence of the miscibility, the glass temperature $T_g$ or the so-called "optical method", i.e., the clarity of a film poured from a homogeneous solution of the polymer mixture, was often used as a reference. (See Brandrup-Immergut, Polymer Handbook, Ed., III, 211–2113). As a further test for the miscibility of polymers which are different from one another, the occurrence of the lower critical solution temperature (LCST) is used. (See DE-A 34 36 476.5 and DE-A 34 36 477.3). The occurrence of the LCST is based on the process which occurs during warming, where the polymer mixture, which has been clear and homogeneous until then, separates into phases and becomes optically cloudy to opaque. This behavior is a clear indication, according to the literature, that the original polymer mixture had consisted of a single homogeneous phase which was in equilibrium. Examples of existing miscibility are represented, for example, by the systems polyvinylidene fluoride with polymethyl methacrylate (PMMA) or with polyethyl methacrylate. (U.S. Pat. Nos. 3,253,060, 3,458,391, and 3,459,843). Recent results concerning "polymer blends" and possible applications for them are reported by L.M. Robeson (Polym. Engineering & Science, 24 (8), 587–597 (1984)).

Copolymers of styrene and maleic acid anhydride, as well as of styrene and acrylonitrile are compatible with polymethyl methacrylate (PMMA) under certain conditions (DE-A 20 24 940). The improved properties of molding materials of these types are emphasized. In the same way, copolymers of styrene and monomers which contain hydroxyl groups which can form hydrogen bonds are also compatible with polymethacrylates in certain compositions, for example copolymers of styrene and p(-2-hydroxyhexafluoroisopropyl) styrene (B.Y. Min and Eli M. Pearce, Organic Coatings and Plastics Chemistry, 45, (1981) 58–64), or copolymers of styrene and allyl alcohol (F. Cangelosi and M.T. Shaw, Polymer Preprints (Am. Chem. Soc., Div. Polym. Chem.) 24, (1983), 258–259). Compatibility was also found in the system of acrylonitrile copolymers mixed with poly(tetrahydrofurfuryl methacrylate) (Goh, S.H., Siow, K.S., J. Appl. Polym. Sci., (1987), 33(5) 1949). In the same way, polytetrahydrofurfuryl methacrylate is compatible with copolymers of styrene and allyl alcohol (Goh, S.H., Polym. Bull., (1987), 17(3), 221–4). Compatibility is also found for acrylonitrile/styrene copolymers, i.e. acrylonitrile/ α-methyl styrene copolymers with polymethyl methacrylates which contain sterically hindred amino groups. For example, a methyl methacrylate/2,2,6,6-tetramethyl piperidinyl methacrylate copolymer is compatible with these styrene/acrylonitrile or α-styrene/acrylonitrile copolymers. (Goh et al., J. Appl. Polym. Sci., (1986), 31, 2055).

Compatibility is also found for mixtures of polypvinyl phenol and polymethacrylates. For example, poly-p-vinyl phenol is compatible with polymethyl methacrylate, polyethyl methacrylate, polypropyl methacrylate or polytetrahydrofurfuryl methacrylate. (Goh, S.H., Siow, K.S., Polym. Bull., (1987), 17(5), 453–8).

Polystyrene itself, as well as other polymers which contain styrene, are considered to be incompatible with polymethyl methacrylate. For example, M.T. Shaw and R.H. Somani indicate a miscibility with polystyrene of only 3.4 ppm (PMMA with a molecular weight of 160,000) or 7.5 ppm (PMMA with a molecular weight of 75,000) (Adv. Chem. Ser., (1984), 206 (Polym. Blends Compos. Multiphase Syst.), 33–42; CA 101 : 73417e). Even polystyrene with a very low molecular weight has little compatibility with PMMA. For example, a mixture of 20% of a styrene oligomer with an extremely low molecular weight (MW : 3,100) already does not yield a clear product any more. At a molecular weight of 9,600, which is also still very low, even a solution of only 5 % in PMMA is only translucent. (Raymond R. Parent and Edward V. Tompson, Journal of Polymer Science: Polymer Physics Edition, Vol 16, 1829–1847 (1978)). Other polymethacrylates and polyacrylates demonstrate just as little miscibility with polystyrene to form transparent plastics. This is true, for example, for polyethyl methacrylate, polybutyl methacrylate, polyisobutyl methacrylate, polyneopentyl methacrylate, polyhexyl methacrylate and many others. See also R.H. Somani and M.T. Shaw, Macromolecules 14, 1549–1554 (1981).

In contrast, mixtures of polystyrene and polycyclohexyl acrylate and mixtures of polystyrene and polycyclohexyl methacrylate are completely compatible. (see German patent application P 36 32 369.1 filed 9/24/86). The compatibility is so good that when these mixtures are heated, an LCST does not occur, i.e. the compatibility exists over the entire accessible temperature range. This good polystyrene compatibility no longer exists for heavily substituted cyclohexyl derivatives. Compatibility with polystyrene is found neither for poly-3,3,5-trimethylcyclohexyl methacrylate nor for polyisobornyl methacrylate. In comparison, the compatibility of poly-α-methyl styrene with polymethacrylates is better (see also German patent application P 36 32 370.5).

Mechanical mixtures of polymers (polyblends) have resulted in plastic products with improved properties in certain cases and in certain areas of the plastics industry (See Kirk-Othmer 3rd edition, Vol. 18, pp. 443-478, J. Wiley (1982)). The physical properties of such "polyblends" generally represent a compromise, which can mean an overall improvement as compared with the properties of the individual polymers. In these situations, multi-phase polymer mixture have achieved much greater commercial significance than compatible miscible mixtures (See Kirk-Othmer, loc. cit., p. 449).

Multi-phase and compatible miscible mixtures must therefore be considered separately with regard to both their physical properties and their properties which are relevant for application technology, especially their optical properties (transparency, clarity, etc.). As already explained, a lack of compatibility often sets narrow limits for mixing plastics with the goal of achieving an improved overall spectrum of properties.

SUMMARY OF THE INVENTION

Accordingly, one object of the present invention is to provide compatible miscible polymer mixtures having an improved overall spectrum of properties.

A further object is to prepare compatible miscible polymer mixtures having improved optical properties for use in optical fiber technology and other areas of optical application.

These and other objects which will become apparent from the following specification have been achieved by the present polymer mixtures and articles.

Surprisingly, it was now found that mixtures of styrene polymers and a polymer component containing a heterocyclic ring having 5-8 ring atoms and at least 2 heteroatoms in the ring are compatible. The polymer mixtures of the present invention are, therefore, prepared from a first polymer which is a styrene polymer or copolymer and a second polymer which contains monomers containing a heterocyclic ring. The articles of the present invention can be prepared by forming a coating of the first or second polymer on the second or first polymer or by forming a coating of the first or second polymer on a polymer blend (mixture) of the first and second polymers.

DETAILED DESCRIPTION OF THE PREFERRED EMBODIMENTS

The present invention concerns polymer mixtures composed of two different polymers P1 and P2, which form compatible polymer mixtures where the mixtures contain (A) 0.1-99.9 wt%, preferably 10-99 wt%, especially 50-90 wt% of the first polymer P1 which is composed of at least 20% and up to 100% by weight of styrene and 80 to 0% by weight of additional monomers which can be copolymerized with styrene, and (B) 99.1-0.1 wt%, preferably 1-90 wt%, especially 10-50 wt% of the second polymer P2 which is composed of at least 20% and up to 100% by weight of monomers with Formula I

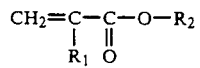   (I)

where $R_1$ stands for hydrogen, methyl or a

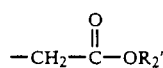

group and where $R_2$ and $R_2'$ stand for a

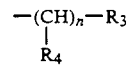

group, with the proviso that n is 0, 1, 2 or 3, $R_3$ stands for a heterocyclic ring with 5-8 ring atoms and at least 2 heteroatoms in the ring, with oxygen being at least one of the heteroatoms, and $R_4$ is hydrogen or an alkyl group with 1-6 carbon atoms. When n=2 or 3, the individual groups $R_4$ can be the same or different. The second polymer P2 may also contain 80 to 0% by weight, preferably 80 to 2% by weight, of other monomers which can be copolymerized with monomers having Formula I.

To the extent that the heteroatoms in the heterocyclic do not represent oxygen atoms, they are preferably selected from the group consisting of nitrogen, sulfur, and, less preferred, phosphorus.

In general, the number of heteroatoms in the ring does not exceed four and preferably the ring contains 2 or 3 heteroatoms. Furthermore, heterocycles with 5 and 6 ring members are preferred, with at least one ring member preferably representing a —CH$_2$— group.

The heterocyclic ring may be substituted with one or two substituents on each ring member. Particularly preferred substituents are alkyl groups with 1 to 6 carbon atoms.

As is evident from the following, polymer P1 and polymer P2 are always clearly different from one another in terms of the components which determine their structure. According to the teachings in the art, therefore, compatibility could not be expected. Preferably, the sum of the amounts of polymers P1 and P2 is 100 wt% of the total polymers in the mixture, but under some circumstances, the polymer mixture can be used in place of a single polymer, i.e., in combination with other polymers.

The compatibility of the present mixtures of, for example, polystyrene (polymer P1) and heterocyclic poly(meth)acrylates (polymer P2) is all the more surprising since polystyrenes generally do not form any compatible mixtures with polymethacrylates and polyacrylates other than polycyclohexyl methacrylate and polycyclohexyl acrylate.

According to the present invention, the compatibility of the mixtures formed from polymers P1 and P2 is actually so good that at a temperature of 200° C. and above, no de-mixing occurs. Polymers P2 which are composed of at least 20% by weight and up to 100% by weight of monomers with Formula I are preferred. Preferably, the heterocyclic group $R_3$ does not contain any double bonds in the ring. The monomers with Formula I, therefore, do not include any aromatic groups for $R_3$. Polymer mixtures of polystyrene as polymer P1 and polymers P2 in which the monomers of Formula I where the heterocyclic group $R_3$ contains 2 oxygen atoms in the ring are particularly preferred. Heterocycles $R_3$ in which the two oxygen atoms are separated from one another only by a carbon atom, in other words heterocycles which represent an acetal or a ketal, are especially preferred. Heterocycles with 5 ring atoms are preferred, with heterocycles of the 1,3-dioxolane type being especially preferred.

In an especially preferred embodiment, 20-100% by weight of polymer P2 is composed of monomers with the Formula I'.

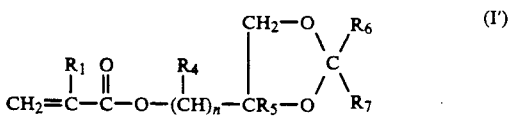

Here, $R_4$, $R_5$, $R_6$, $R_7$, independently, represent hydrogen or an alkyl group with 1-6 carbon atoms.

In a preferred embodiment, $R_6$ and $R_7$ each stand for alkyl group with 1-6 carbon atoms, with the following being very especially preferred: $R_6=R_7=$methyl. It is furthermore preferred that $R_4$ stands for hydrogen and $n=1$. In the especially preferred embodiment, $R_5$ also stands for hydrogen In this case, polymer P2 consists of 20 to 100% by weight of monomers with Formula I''.

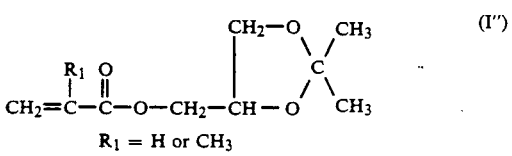

$R_1 = H$ or $CH_3$

The excellent compatibility of these polymer mixtures permits an extensive range of variation, with regard to the mixture ratio as well as to the mixture components. This is especially true when using pure polystyrene as polymer P1. Therefore it is possible, on the one hand, to extensively vary the polymer component P2 by copolymerization with suitable monomers. On the other hand, the polymer component P1 can also be changed by copolymerization with suitable monomers, within a certain framework, without losing compatibility.

Suitable comonomers are found, for example, in the Kunststoff-Handbuch, published by R. Vieweg and G. Daumiller, Volume V, Carl Hanser Verlag (1969), p. 104-108. Suitable comonomers for polymer P2 are acrylic or methacrylic acid esters, in general those of alcohols with 1-18 carbon atoms, especially alkanols. Alcohols with 1-12 carbon atoms are preferred. Methyl methacrylate can be particularly mentioned as a comonomer. Preferably the proportion of copolymerizable monomers containing cyclohexyl alcohol as the alkanol is limited to <9.9% by weight. In this preferred embodiment, the proportion of cyclohexyl(meth)acrylate in the polymer P2 is <9.9% by weight, preferably <1% by weight. Monomers with groups in the molecule which absorb UV light are also possible and of interest, for example those mentioned or described in U.S. Pat. No. 4,576,870 incorporated herein by reference.

The proportion of the monomer I in polymer P2 generally lies in the range of 100-20% by weight, preferably in the range of 100-30% by weight, and especially preferably in the range of 80 to 40% by weight. Replacement of the styrene in polymer P1 with alkyl-substituted, especially $C_1$-$C_4$-alkyl-substituted styrenes, such as m-methyl styrene, p-methyl styrene, p-tert.-butyl styrene, α-methyl styrene, is possible up to about 20%, preferably up to about 10% by weight. In the same way, the styrene can be partially replaced with esters of acrylic acid and methacrylic acid, particularly by esters of $C_1$-$C_{18}$ alcohols, preferably of $C_1$-$C_8$ alkanols. Furthermore, the styrene can be replaced by other vinyl compounds, especially vinyl esters of $C_{2-10}$ monocarboxylic acids, such as vinyl acetate and vinyl propionate, in smaller amounts of about 20% by weight or less.

It should be noted that the styrene content of the polymer P1 must be at least 20% by weight, preferably at least 50% by weight, especially preferably at least 90% by weight, and very especially preferably at least 99% by weight. Polymer P1 is polystyrene in the most preferred embodiment, but can be extensively modified with other hydrophobic vinyl compounds. The proportion of highly polar monomers, such as e.g., acrylonitrile, maleic acid anhydride, maleic acid imides, p-(2-hydroxyhexafluoroisopropyl) styrene or allyl alcohol in polymer P1 is very limited. The proportion of these polar monomers should amount to from 0 to less than 10% by weight, or less than 5% by weight of the polymer P1. Polymers P1 which contain less than 0.1% by weight of these polar monomers, preferably 0% by weight, are especially preferred.

In the same way as described above for polymer P1, monomer I in polymer P2 can be replaced proportionally with the comonomers described above for polymer P2. The variations will generally be guided by the requirements of the specific area of application.

Thus, the content of monomer I in a polymer P2 that is to be used in high proportions, for example to modify the index of refraction of pure polystyrene, will be higher, usually distinctly above 20 wt.%, or preferably distinctly above 30 wt.%, than the proportion of monomer I of a polymer P2 that, is only to be compatible at room temperature, but is to show phase separation (incompatibility) again at elevated temperature.

As a rule, compatibility of the polymer P1 with polymer P2 will still exist if the polymer P1 contains lesser proportions of the monomer I and/or if the polymer P2 also contains styrene. The styrene content of the polymer P1, however, is clearly higher than the styrene content of the polymer P2. As a rule, the difference in the styrene content (% by weight styrene in polymer P1 minus % by weight styrene in polymer P2) is greater than 10% by weight, preferably greater than 30% by weight, especially preferably greater than 50%. by weight, and very especially preferably greater than 90% by weight. In the same way, the monomer I content of polymer P2 is clearly higher than the monomer I content of polymer P1. Therefore, as a rule, polymer P1 contains less than 5% by weight monomer with Formula I, preferably less than 0.1% by weight. In a preferred embodiment, P1 is polystyrene.

The characterization of the polymer mixtures according to the invention as compatible mixtures takes place according to the recognized criteria (See Kirkothmer, loc cit., Vol. 18, pp. 457–460; J. Brandrup, E.H. Immergut, Polymer Handbook, 2nd edition, J. Wiley (1975), pp. III–211).

a) When using optical methods, a single refractive index is observed in the polymer mixtures according to the invention, the refractive index being between those of the two polymers P1 and P2.

b) The polymer mixtures possess a single glass transition temperature Tg, which lies between that of polymers P1 and P2.

Production of the polymer P1 and P2 can take place according to the known rules of polymerization and according to known methods. The polymers of type P1 can be produced, for example, according to Houben-Weyl, Methoden der Organischen Chemie, 4th edition, Volume XIV/1, pp. 761-841, Georg Thieme Verlag (1961). Some of these polymers are also commercially available in a suitable form. Preferably, the radical polymerization method is used, but ionic polymerization methods can also be used.

The molecular weights of the polymers P1 used according to the invention are generally above 3,000, preferably in a range of 5,000–1,000,000, especially preferably in a range of 20,000–500,000 as determined by light scattering. See Kirk-Othmer, 3rd edition, Vol. 18, loc. cit., p. 211). It should be emphasized, however, that the molecular weights do not appear to have any critical influence on the suitability of a polymer as a component in the compatible polymer mixtures. This is true both for homopolymers and the copolymers of types P1 and P2.

For compatibility of polymer P1 and polymer P2, the tacticity of the polymers has a certain significance. As a rule, a polymer P2 with a low proportion of isotactic triads, such as one obtained by radical polymerization, for example, is preferred over polymers with a high isotactic proportion, such as one produced by specific ionic polymerization.

The production of the homopolymers and/or copolymers P2 is generally carried out by radical polymerization. (See H. Rauch-Puntigam, Th. Volker, Acryl- und Methacrylverbindungen, Springer-Verlag, 1967). Even though production by anionic polymerization or group transfer polymerization is possible (see also O.W. Webster et al., J. Am. Chem. Soc. 105, 5706 (1983)), the preferred method of production is radical polymerization.

The molecular weights of polymers P2 are very generally above 3,000, generally in a range of 10,000 to 1,000,000, preferably 20,000 to 300,000 (by light scattering). For the selection of the monomer components which are to be used as comonomers for P2, care should be taken that the glass transition temperature Tg of the resulting polymer does not have a restrictive influence on the technical applicability of the total system.

For the production of molded objects or articles made from the polymer mixture, for example, at least one of the polymers P1 and P2 should demonstrate a glass transition temperature $Tg>70°$ C. It is preferred for this application that the polymer mixture also has a glass transition temperature $Tg>70°$ C. This restriction applies preferably for the production of injection-molded, pressed or extruded objects made of the polymer mixture. For other areas of application, for example for varnishes and paints, for elastomers, or for reversible thermotropic vitrification (polymer: blend with cloud point on heating) or for use according to DE-A 34 36 477.3, however, polymer P2 with a glass temperature $Tg<40°$ C. or especially $<20°$ C. is preferred.

The compatible mixtures can be prepared by different procedures. For example, they can be made by intensive mechanical mixing of polymers P1 and P2 in the melt, in an extruder, etc.; or they can also be made from a common solvent as so-called "solution cast polyblends". (See Kirk-Othmer "Encyclopedia of Chemical Technology" 3rd Ed., Vol. 18, pg. 443–478, J. Wiley, 1982). The polymer P1 can also be dissolved in the mixture of monomers of the other polymer P2, and polymer P2 can then be produced in the presence of polymer P1. Conversely, polymer P1 can naturally also be produced in the presence of polymer P2. Likewise, the polymer mixture can be produced by common precipitants. There are no limits to the method of blending. As a rule, blends of polymers P1 and P2 are first made, preferably starting with solids, for example in the form of a bead polymer or a granulate, using slow mixing units such as drum mixers, gyrowheel mixters, or double-chamber plow blade mixers. The slow mixing units produce mechanical blending without the phase boundaries being eliminated. (See Ullmann's Encyklopadie der Technischen Chemie, 4th Edition, Vol. 2, pg. 282–311, Verlag Chemie). The thermoplastic treatment is then carried out by homogenous blending in the melt using heated mixing units at suitable temperatures, for example 150 to about 300° C. in kneaders or preferably extruders, for example single-screw or multiple-screw extruders, or optionally in extruders with oscillating screw and shear pins (for example, in a BUSSCO kneader).

Granulates of uniform shape can be produced by this process (for example, hot chips, cube-shaped, and round grained granulates). The particle size of the granulate is generally in the range of 2 to 5 mm. Another simple method for producing polymer blends is the blending of polymer dispersions (containing polymer P1 and polymer dispersions containing polymer P2). These dispersion-blends can be coagulated together, spray-dried together, or squeezed out using an extruder. On the other hand, the dispersion blends can also be dried together to form a film.

The existence of compatible polymer mixtures offers advantages which make the corresponding technical application possibilities obvious. "Polystyrene" is used to represent, but not to limit, the possibilities in the category of polymer P1.

1) First of all, in contrast to blends of most other poly(meth)acrylates and polystyrenes, the polymer blends (polystyrene/polymer P2) are compatible. In other words, the polymer blends pursuant to the invention are glass-clear in the unpigmented state, in contrast to incompatible polystyrene/poly(meth)acrylate blends (they show no light scattering, i.e., the "haze" is generally below 10%). However, blends that are compatible only at room temperature but show separation at elevated temperature are also considered part of the invention.

2) Blends of polystyrenes and polymer P2, like polystyrenes and polymer P2 themselves, show low water absorption.

3) The birefringence of polystyrene can be reduced by blending with polymer P2. The two aforementioned properties qualify the polymer blends pursuant to the invention as data storage materials in particular for optically readable information carriers. See J. Hennig, Kunststoffe 75, pg. 425 (1985).

4) The refractive index of polystyrene can be reduced by blending with polymer P2. For example, the refractive index of polystyrene can be modified by blending with polymer P2 so that the refractive index of the polystyrene/polymer P2 blend matches the refractive index of an intercalated rubber phase. Transparent, impact-resistant plastics can be obtained in this way.

Also, of special interest are polymer compositions that consist of approximately 40–99 wt.%, preferably 70–95 wt.% of the polymer blend and 60–1 wt.%, preferably 30–5 wt.% of another polymer P3, chemically different from P1 and P2, with polymer P3 being incompatible with polymer P1, P2, and with the blend.

The composition of the polymer blend in this case is generally chosen so that the refractive index of the polymer P3 conforms to the refractive index of the blend. As a rule, therefore, at room temperature:

$$|n_D^{25}{}_{PM} - n_D^{25}{}_{P3}| < 0.01$$

In general, the polymer P3 is incompatible (immiscible) with the blend, will have a Tg<20° C., and will be covalently bonded to at least one of the constituents of the polymer blend, in other words with P1 or P2. The polymer P3 can also be crosslinked.

It is very particularly preferable for the polymer P3 to be polybutadiene or polyisoprene.

Polymer compositions made up of 40-99 wt.% of the polymer blend and 1-60 wt.% P3, particularly when P3 has a Tg<20° C., are distinguished by the fact that their impact strength is improved over that of the pure polymer blend.

In particular, polymer compositions consisting of 40-99 wt.% of the polymer blend and 60-1 wt.% P3 permit simple impact strength blending of polymer P2. Thus, P2 that may be brittle can be blended into a high impact strength, clear polymer composition by blending with commercial P1 provided with high impact strength (for example, styrene-butadiene block copolymers).

5. Production of optical fibers is possible by encasing polystyrene with polymer P2:

The following characteristics are then obtained:

| Core: | Polystyrene Refractive index $n_D = 1.59$ |
|---|---|
| Coating: | Polymer P2, documented as example: $n_D = 1.49$ In general, polymers P2 consisting of 100 wt.% monomers of Formula I will not be used for the coating, but copolymers of methyl methacrylate and monomers of Formula I. |
| Transition: | Continuous. This zone corresponds to a polymer blend. The core conforms to the definition of P1, and the coating corresponds to the definition of P2. |

Such fibers can be used as optical waveguide cables, for example.

6) Items made of polystyrene with a thin coating of polymer P2, especially of a polymer P2 with UV-absorbers, preferably copolymerized, are feasible. In contrast to uncoated polystyrene, such objects are weather-resistant. The otherwise serious problem of recycling heterogeneously coated plastic waste is eliminated, since waste can be reincorporated because of its good compatibility. As a rule, the objects made of polystyrene or of the polymer blend can be manufactured by injection, pressing, extrusion, rolling, or casting. The coating of polymer P2 is usually applied by painting or by coextrusion.

7) Panels of polystyrene with a coating of polymer P2 can be made. Panels of such construction have transparency approximately 2% better than untreated polystyrene panels. As a rule, panels with a coating of polymer P2 also have better scratch resistance and modified corrosion resistance. Of particular interest are multiple-frame panels such as those used for glazing greenhouses that have been made of polystyrene or a polymer blend and have a coating of a polymer P2. (DE-A 16 09 777). Polystyrenes can also be cemented with polymer P2, or preferably with monomer/initiator mixtures containing monomer I. In this case, the high rate of polymerization of acrylates can be combined with good polymer compatibility. Such objects are to be considered as solid objects included in the scope of the invention with a polymeric configuration made up of a layer of polymer P1, a second layer of polymer P2, and an interlayer of a compatible polymer blend consisting of P1) 0.1 to 99.9 wt.% of a polystyrene that consists of 20 to 100 wt.% styrene and 80 to 0 wt.% monomers copolymerizable with styrene, and P2) 99.9 to 0.1 wt.% of a polymer P2 that is made up of 20 to 100 wt.% monomers of Formula I and 80 to 0 wt.% monomers copolymerizable with monomers of Formula I.

Objects made of waste materials or with a content of waste material are considered similarly, for example when waste material is incorporated into a polymer P1. They conform to the definition by which a layer of the compatible polymer blend is covered over by a top coat of the second polymer.

In all of the objects mentioned above, the top coat should preferably contain 0.1 to 20 wt.% (based on the top coat) of at least one UV-absorber suitably distributed. Usable UV absorbers are mentioned, for example, in Kirk-Othmer, Encyclopedia of Chemical Technology, 3rd Ed., Vol. 23, pp. 615-627, J. Wiley (1983); R. Gaechter and H. Mueller, Taschenbuch der Kunststoff-Additive, Carl Hanser Verlag (1979), pp. 90-143; Ullmann's Encyklopadie der Techn. Chemie, 4th Edition, Volume 15, pp. 256-260, Verlag Chemie (1978); and US-A 4,576,870.

8) Processing benefits result from the use of blends consisting of >90 wt.% polystyrene and <10 wt.% polymer P2. In this case, the polymer P2 performs the function of a processing aid.

9) Transparent molded objects can be obtained from polystyrene/polymer P2 blends that have been modified on the surface by the action of energy, for example suitable irradiation, so that the polymer P2 has been degraded, but the polystyrene has not. (Molded objects with antireflective surfaces, resists, etc).

The invention therefore concerns not only polymer blends of 0.1-99.1 wt.% of a polystyrene that is made up of at least 20 and up to 100 wt.% styrene and 80-0 wt.% of other monomers copolymerizable with styrene (polymer P1) and 99.9-0.1 wt.% of a polymer that is made up of at least 20 wt.% and up to 100 wt.% of monomers of Formula I shown above (polymer P2), but also polymer compositions in which polymer P2 adheres to polymer P1. Especially preferred in this case are polymer compositions in which a molded object of polymer P1 is coated with a jacket of polymer P2. Of particular industrial importance is the fact that the polymers P2 adhere outstandingly to a molded object of P1.

The fact that the polymers P2 demonstrate excellent adhesion to a molded element made of P1 is of particular technical significance.

Other features of the invention will become apparent in the course of the following descriptions of exemplary embodiments which are given for illustration of the invention and are not intended to be limiting thereof.

The VICAT softening temperature was determined according to DIN 53460. Determination of the reduced viscosity ($\eta$spec/c) is based on DIN 1342, DIN 51562 and DIN 7745. Determination of the light permeability can be carried out according to DIN 5036, unless otherwise specified. The cloudiness (haze) is indicated in % (ASTM D 1003).

EXAMPLES

Example 1

Compatible mixtures of poly-(2,2-dimethyl-1,3-dioxolan-4-yl methyl methacrylate) and polystyrene.

$$CH_2=C(CH_3)-C(=O)-O-CH_2-CH{\overset{CH_2-O}{\underset{O}{\diagup}}}C{\overset{CH_3}{\diagdown CH_3}} \quad (I\text{-}1)$$

Using poly-(2,2-dimethyl-1,3-dioxolan-4-yl methyl methacrylate) as P1, produced by radical polymerization, and polystyrene as P2, films are produced in a ratio of 80/20, 50/50, 20/80. All films were glass-clear and compatible. De-mixing did not take place, even when the films were heated to 260° C.

Example 2

Polymer P2 consisted of 100 % by weight of monomers with Formula I-2.

$$CH_2=C(CH_3)-C(=O)-O-CH_2-C{\overset{CH_2-O}{\underset{CH_2CH_3}{\diagup}}}{\overset{\diagdown}{\underset{O}{\diagdown}}}C{\overset{CH_3}{\diagdown CH_3}}$$

Again, mixtures with polystyrene in ratios of 20/80, 50/50 and 80/20 were clear as glass and compatible. Production of the films, in each case, was performed by dissolving the polymers in toluene to form solutions of 20 % by weight, and allowing the solutions to evaporate.

Example 3

Production of the polymers 20 g 2,2-dimethyl-1,3-dioxolan-4-yl methyl methacrylate was mixed with 0.03 g t-butyl perneodecanoate and 0.06 g dodecyl mercaptan and polymerized in a glass vessel, under inert gas (argon) for 2 hours, at 60° C. The mixture was cooled, diluted with acetone and precipitated in methanol. After drying in a vacuum, a polymer with J=57 ml/g was obtained.

This polymer was mixed with polystyrene to investigate the compatibility, on the one hand (see Example 1), and used to coat polystyrene plates, according to the invention, on the other hand (see Example 4).

Example 4

Coating of polystyrene

A polystyrene plate with a thickness of 3 mm (produced from polystyrene, 168N from BASF) was coated with a solution of 15 g polymer according to Example 3 and 0.75 g 2-hydroxy-4-methoxy-benzophenone in a mixture of 17 g 2-butanone and 68 g diacetone alcohol. A glass-clear plate having a protective layer with a thickness of approximately 10 microns of the polymer according to Example 3 was obtained. The adhesion of the layer to the polystyrene substrate was excellent (GTO according to DIN 53 151).

Example 5

Production of a copolymer

A mixture of 100 g 2,2-dimethyl-1,3-dioxolan-4-yl methyl methacrylate and 100 g methyl methacrylate was mixed with 0.2 g t-butyl perneodecanoate and 0.6 g dodecyl mercaptan and polymerized under inert gas for 4 hours, at 50° C. The mixture was then diluted with acetone, precipitated in methanol and dried in a vacuum (J=74 ml/g).

Example 6

Coating of polystyrene

Analogous to Example 4, polystyrene-plate with a thickness of 3 mm (produced from polystyrene 168N from BASF) was coated under the conditions stated in Example 4.

A glass-clear plastic plate was obtained with clearly improved optical properties as compared with the initial material. The adhesion of the coating to the substrate was excellent (GTS according to DIN 53 151).

Obviously, numerous modifications and variations of the present invention are possible in light of the above teachings. It is therefore to be understood that within the scope of the appended claims, the invention may be practiced otherwise than as specifically described herein.

What is new and desired to be secured by letters patent of the United States is:

1. An article or object, comprising (i) a core material of a first polymer P1, said first polymer comprising 20–100 wt.% styrene monomer units; a second polymer P2, said second polymer comprising 20–100 wt.% of monomers having formula I $$CH_2=C-C-O-R_2 \quad (I)$$
$$\phantom{CH_2=}\underset{R_1}{|}\ \underset{O}{\|}$$

where $R_1$ stands for hydrogen, methyl or a $$-CH_2-\overset{O}{\underset{\|}{C}}-O-R_2'$$

group and wherein $R_2$ and $R_2'$ are the group $$-(CH)_n-R_3$$
$$\phantom{-(CH)_n}\underset{R_4}{|}$$

wherein n is 0–3, $R_3$ is a 5–8 membered heterocyclic ring having at least two heteroatoms in the ring, at least one of said heteroatoms being an oxygen, and $R_4$ is a hydrogen or a $C_{1-6}$ alkyl group, or a polymer blend consisting essentially of 0.1–99.9 wt.% of said first polymer and 99.9–0.1 wt.% of said second polymer, and (ii) a coating material on said core material, said coating material comprising said first or second polymer.

2. The article or object of claim 1, wherein said core material is said first polymer or said polymer blend and said coating material is said second polymer.

3. The article or object of claim 1, wherein said core material is said second polymer or said polymer blend and said coating material is said first polymer.

4. The article or object of claim 1, wherein said second polymer comprises 30-100 wt.% of monomers having formula (I).

5. The article or object of claim 1, wherein said second polymer comprises 40-80 wt.% of monomers having formula (I).

6. The article or object of claim 1, wherein said first polymer comprises at least 50 wt.% styrene.

7. The article or object of claim 1, wherein said first polymer comprises at least 90 wt.% styrene.

8. The article or object of claim 1, wherein said first polymer comprises at least 99 wt.% styrene.

9. The article or object of claim 1, wherein said heterocyclic ring contains one oxygen atom and 1-3 heteroatoms selected from the group consisting of oxygen, nitrogen, sulfur and phosphorus.

10. The article or object of claim 1, wherein said heterocyclic ring is a 5- or 6-membered ring containing two oxygen atoms.

11. The article or object of claim 1, wherein said heterocyclic ring is an acetal or ketal.

12. The article or object of claim 1, wherein said second polymer comprises 20-100 wt.% of monomer units having formula (I')

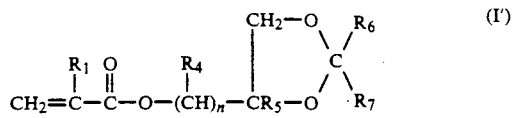

wherein $R_1$ is hydrogen or methyl, and $R_4$, $R_5$, $R_6$ and $R_7$, independently, are hydrogen or a $C_{1-6}$ alkyl group.

13. The article or object of claim 1, wherein said first polymer comprises about 20 wt.% or less of copolymerizable monomers selected from the group consisting of acrylic and methacrylic acid esters of $C_{1-18}$ alcohols and vinyl esters of $C_{2-10}$ monocarboxylic acids.

14. The article or object of claim 1, wherein said first polymer comprises less than 5 wt.% of polar monomers selected from the group consisting of (meth)acrylonitrile, maleic anhydride, maleimide, and p-(2-hydroxyhexafluoroisopropyl)styrene.

15. The article or object of claim 1, wherein said polymer blend comprises 10-99 wt.% of said first polymer and 90-1 wt.% of said second polymer.

16. The article or object of claim 1, wherein said polymer blend comprises 50-90 wt.% of said first polymer and 50-10 wt.% of said second polymer.

17. The article or object of claim 1, wherein said polymer blend comprises 20-80 wt.% of said first polymer and 80-20 wt.% of said second polymer.

18. The article or object of claim 2, wherein said second polymer contains 0.1-20 wt.% based on said second polymer of a copolymerizable UV absorbing monomer.

19. The article or object of claim 1, wherein said article or object is a data storage disk.

20. The article or object of claim 1, wherein said article or object is an optical fiber.

* * * * *